United States Patent
Cafarelli et al.

(10) Patent No.: US 10,243,862 B2
(45) Date of Patent: Mar. 26, 2019

(54) SYSTEMS AND METHODS FOR SAMPLING PACKETS IN A NETWORK FLOW

(71) Applicant: Gigamon Inc., Milpitas, CA (US)

(72) Inventors: Dominick Cafarelli, Ossining, NY (US); Murali Bommana, Fremont, CA (US); Sandeep Dahiya, San Jose, CA (US); Jesse C. Shu, Palo Alto, CA (US); Anoop V. Kartha, San Jose, CA (US)

(73) Assignee: Gigamon Inc., Santa Clara, CA (US)

( * ) Notice: Subject to any disclaimer, the term of this patent is extended or adjusted under 35 U.S.C. 154(b) by 54 days.

(21) Appl. No.: 14/213,659

(22) Filed: Mar. 14, 2014

(65) Prior Publication Data

US 2014/0321278 A1 Oct. 30, 2014

Related U.S. Application Data

(60) Provisional application No. 61/800,098, filed on Mar. 15, 2013.

(51) Int. Cl.
*H04L 12/851* (2013.01)
*H04L 12/26* (2006.01)

(52) U.S. Cl.
CPC ........ *H04L 47/2441* (2013.01); *H04L 43/026* (2013.01); *H04L 43/12* (2013.01)

(58) Field of Classification Search
CPC ....... H04L 49/00; H04L 49/20; H04L 49/208; H04L 12/2602–12/2607; H04L 43/00–43/02; H04L 43/018–43/024
See application file for complete search history.

(56) References Cited

U.S. PATENT DOCUMENTS

| | | | |
|---|---|---|---|
| 7,424,018 B2 | 9/2008 | Gallatin et al. | |
| 7,436,832 B2 | 10/2008 | Gallatin et al. | |
| 7,440,467 B2 | 10/2008 | Gallatin et al. | |
| 7,626,938 B1 * | 12/2009 | Orr et al. | 370/251 |
| 7,792,047 B2 | 9/2010 | Gallatin et al. | |
| 7,849,506 B1 * | 12/2010 | Dansey et al. | 726/22 |
| 8,315,256 B2 | 11/2012 | Leong et al. | |
| 2007/0047456 A1 * | 3/2007 | Jorgensen et al. | 370/250 |
| 2009/0080338 A1 * | 3/2009 | Parker et al. | 370/250 |
| 2009/0080421 A1 * | 3/2009 | Ou | 370/389 |
| 2009/0110003 A1 * | 4/2009 | Julien | H04L 49/90 370/476 |
| 2009/0262745 A1 * | 10/2009 | Leong | H04L 12/4625 370/396 |
| 2010/0161791 A1 * | 6/2010 | Duffield et al. | 709/224 |
| 2011/0128974 A1 * | 6/2011 | Breslin et al. | 370/474 |

(Continued)

*Primary Examiner* — Hassan Kizou
*Assistant Examiner* — Hector Reyes
(74) *Attorney, Agent, or Firm* — Perkins Coie LLP

(57) ABSTRACT

A method for sampling packets for a network flow, includes: receiving a packet at a network port of a network switch appliance, the network switch appliance comprising an instrument port for communication with a network monitoring instrument; determining whether the packet belongs to a network flow that is desired to be monitored, wherein the act of determining is performed based at least in part on one or more information in a control plane using a processing unit; and passing the packet to the instrument port if the packet belongs to the network flow.

39 Claims, 7 Drawing Sheets

(56) References Cited

U.S. PATENT DOCUMENTS

| | | | |
|---|---|---|---|
| 2011/0289220 A1* | 11/2011 | Henson | H04M 3/5116 709/227 |
| 2013/0054737 A1* | 2/2013 | Miranda et al. | 709/217 |
| 2013/0305272 A1* | 11/2013 | Fullett et al. | 725/14 |
| 2014/0043980 A1* | 2/2014 | Anthony, Jr. | H04L 43/00 370/241 |
| 2014/0098822 A1* | 4/2014 | Galles et al. | 370/412 |
| 2014/0254396 A1* | 9/2014 | Hilton et al. | 370/250 |

\* cited by examiner

SYSTEMS AND METHODS FOR SAMPLING PACKETS IN A NETWORK FLOW

RELATED APPLICATION DATA

This application claims priority to and the benefit of U.S. Provisional Patent Application No. 61/800,098, filed on Mar. 15, 2013. The entire disclosure of the above application is expressly incorporated by reference herein.

FIELD

This application relates generally to network switch devices, and more specifically, to systems and methods for sampling packets using a network switch appliances.

BACKGROUND

With increasing network traffic in the internet, network monitoring tools designed to gather and process network traffic may become increasingly difficult to achieve visibility in the entire network. To achieve network visibility, several techniques may be used, including load balancing, filtering and sampling. Sampling techniques may include technologies such as NetFlow, sFlow, cFlow, etc. These flow based sampling techniques may randomly sample 1 packet out of every N packets. For certain applications of network visibility processing, this 1 packet out of every N packet sampling technique is sufficient to infer network monitoring and security performance. However, for certain network and security monitoring, sampling 1 packet out of every N packets may not be sufficient for inferring network monitoring and security performance. The reason for this is that certain analysis techniques may provide inaccurate data results if all of the packets for a given set of user data sessions (network flows) are not available for analysis.

SUMMARY

A method for sampling packets for a network flow, includes: receiving a packet at a network port of a network switch appliance, the network switch appliance comprising an instrument port for communication with a network monitoring instrument; determining whether the packet belongs to a network flow that is desired to be monitored, wherein the act of determining is performed using a processing unit; and passing the packet to the instrument port if the packet belongs to the network flow.

Optionally, the method further includes determining the network flow that is desired to be monitored.

Optionally, the network flow is determined based on a random selection.

Optionally, the network flow is determined based on a round robin selection.

Optionally, the network flow is determined based on a hash value computed using one or more packet attributes.

Optionally, the network flow is determined based on a 5-tuple flow identifier.

Optionally, the network flow is determined based on one or more of a station address, a VLAN ID, and a MPLS tunnel ID.

Optionally, the network flow is determined based on a MPLS label stack comprising one or more MPLS label identifiers.

Optionally, the network flow is determined based on a calling number, a called number, a call identifier, or an information associated with a control protocol.

Optionally, the network flow is determined based on one or more attributes contained in a packet that are associated with a control protocol (e.g., a generic control protocol), and one or more attributes contained in the packet that are associated with a data protocol (e.g., a generic data protocol) correlated with the one or more attributes that are associated with the control protocol.

Optionally, the network flow is determined based on one or more information in a GTP control protocol, a SIP control protocol, a H323 control protocol, a Megaco protocol, or other control protocol.

Optionally, the one or more information comprises one or more of IMSI, MSISDN, and IMEI.

Optionally, the network flow is determined based on a first flow selection criterion for a data path and a second flow selection criterion for a control path.

Optionally, the method further includes receiving additional packets for the network flow, and passing all of the additional packets to the instrument port.

Optionally, the act of determining whether the packet belongs to the network flow that is desired to be monitored is performed based on a 5-tuple flow identifier.

Optionally, the act of determining whether the packet belongs to the network flow that is desired to be monitored is performed based on one or more of a station address, a VLAN ID, and a MPLS tunnel ID.

Optionally, the act of determining whether the packet belongs to the network flow that is desired to be monitored is performed based on a MPLS label stack comprising one or more MPLS label identifiers.

Optionally, the act of determining whether the packet belongs to the network flow that is desired to be monitored is performed based on a calling number, a called number, a call identifier, or an information associated with a control protocol.

Optionally, the act of determining whether the packet belongs to the network flow that is desired to be monitored is performed based on one or more attributes contained in a packet that are associated with a control protocol (e.g., a generic control protocol), and one or more attributes contained in the packet that are associated with a data protocol (e.g., a generic data protocol) correlated with the one or more attributes that are associated with the control protocol.

Optionally, the act of determining whether the packet belongs to the network flow that is desired to be monitored is performed based on one or more information in a GTP control protocol, a SIP control protocol, a H323 control protocol, a Megaco protocol, or other control protocol.

Optionally, the one or more information comprises one or more of IMSI, MSISDN, and IMEI.

Optionally, the act of determining whether the packet belongs to the network flow that is desired to be monitored is performed based on a first flow selection criterion for a data path and a second flow selection criterion for a control path.

Optionally, the packet is passed to the instrument port in an out-of-band configuration.

An apparatus includes: a network port for receiving a packet; an instrument port for communication with a network monitoring instrument; and a processing unit communicatively coupled with the network port and the instrument port, wherein the processing unit is configured for determining whether the packet belongs to a network flow that is desired to be monitored, and passing the packet to the instrument port if the packet belongs to the network flow.

Optionally, the processing unit is further configured for determining the network flow that is desired to be monitored.

Optionally, the processing unit is configured for determining the network flow based on a random selection.

Optionally, the processing unit is configured for determining the network flow based on a round robin selection.

Optionally, the processing unit is configured for determining the network flow based on a hash value computed using one or more packet attributes.

Optionally, the processing unit is configured for determining the network flow based on a 5-tuple.

Optionally, the processing unit is configured for determining the network flow based on one or more of a station address, a VLAN ID, and a MPLS tunnel ID.

Optionally, the processing unit is configured for determining the network flow based on a MPLS label stack comprising one or more MPLS label identifiers.

Optionally, the processing unit is configured for determining the network flow based on a calling number, a called number, a call identifier, or an information associated with a control protocol.

Optionally, the processing unit is configured for determining the network flow based on one or more attributes contained in a packet that are associated with a control protocol (e.g., a generic control protocol), and one or more attributes contained in the packet that are associated with a data protocol (e.g., a generic data protocol) correlated with the one or more attributes that are associated with the control protocol.

Optionally, the processing unit is configured for determining the network flow based on one or more information in a GTP control protocol, a SIP control protocol, a H323 control protocol, a Megaco protocol, or other control protocol.

Optionally, the one or more information comprises one or more of IMSI, MSISDN, and IMEI.

Optionally, the processing unit is configured for determining the network flow based on a first flow selection criterion for a data path and a second flow selection criterion for a control path.

Optionally, the processing unit is configured for receiving additional packets for the network flow, and passing all of the additional packets to the instrument port.

Optionally, the processing unit is configured for determining whether the packet belongs to the network flow that is desired to be monitored based on a 5-tuple.

Optionally, the processing unit is configured for determining whether the packet belongs to the network flow that is desired to be monitored based on one or more of a station address, a VLAN ID, and a MPLS tunnel ID.

Optionally, the processing unit is configured for determining whether the packet belongs to the network flow that is desired to be monitored based on a MPLS label stack comprising one or more MPLS label identifiers.

Optionally, the processing unit is configured for determining whether the packet belongs to the network flow that is desired to be monitored based on a calling number, a called number, a call identifier, or an information associated with a control protocol.

Optionally, the processing unit is configured for determining whether the packet belongs to the network flow that is desired to be monitored based on one or more attributes contained in a packet that are associated with a control protocol (e.g., a generic control protocol), and one or more attributes contained in the packet that are associated with a data protocol (e.g., a generic data protocol) correlated with the one or more attributes that are associated with the control protocol.

Optionally, the processing unit is configured for determining whether the packet belongs to the network flow that is desired to be monitored based on one or more information in a GTP control protocol, a SIP control protocol, a H323 control protocol, a Megaco protocol, or other control protocol.

Optionally, the one or more information comprises one or more of IMSI, MSISDN, and IMEI.

Optionally, the processing unit is configured for determining whether the packet belongs to the network flow that is desired to be monitored based on a first flow selection criterion for a data path and a second flow selection criterion for a control path.

Optionally, the processing unit is configured to pass the packet to the instrument port in an out-of-band configuration.

A computer product includes a non-transitory medium storing instruction, an execution of which causes a method to be performed by a network switch appliance comprising a network port and an instrument port for communication with a network monitoring instrument, the method comprising: determining whether a packet received at the network port belongs to a network flow that is desired to be monitored; and passing the packet to the instrument port if the packet belongs to the network flow.

A method for sampling packets for a network flow includes: receiving a packet at a network port of a network switch appliance, the network switch appliance comprising an instrument port for communication with a network monitoring instrument; determining whether the packet belongs to a network flow that is desired to be monitored, wherein the act of determining is performed based at least in part on one or more information in a control plane using a processing unit; and passing the packet to the instrument port if the packet belongs to the network flow.

Optionally, the method further includes determining the network flow that is desired to be monitored.

Optionally, the network flow is determined based on a hash value computed using one or more packet attributes.

Optionally, the network flow is determined based on a first flow selection criterion for a data path and a second flow selection criterion for a control path.

Optionally, the method further includes receiving additional packets for the network flow, and passing all of the additional packets to the instrument port.

Optionally, the act of determining whether the packet belongs to the network flow that is desired to be monitored is performed based on a 5-tuple.

Optionally, the act of determining whether the packet belongs to the network flow that is desired to be monitored is performed based on one or more of a station address, a VLAN ID, and a MPLS tunnel ID.

Optionally, the act of determining whether the packet belongs to the network flow that is desired to be monitored is performed based on a MPLS label stack comprising one or more MPLS label identifiers.

Optionally, the act of determining whether the packet belongs to the network flow that is desired to be monitored is performed based on a calling number, a called number, a call identifier, or an information associated with the control protocol.

Optionally, the act of determining whether the packet belongs to the network flow that is desired to be monitored is performed based on one or more information in a GTP control protocol, a SIP control protocol, a H323 control protocol, or a Megaco protocol.

Optionally, the act of determining whether the packet belongs to the network flow that is desired to be monitored is performed based on one or more of IMSI, MSISDN, IMEI, and APN information.

Optionally, the act of determining whether the packet belongs to the network flow that is desired to be monitored is performed based on a first flow selection criterion for a data path and a second flow selection criterion for a control path.

Optionally, the packet is passed to the instrument port in an out-of-band configuration.

An apparatus includes: a network port for receiving a packet; an instrument port for communication with a network monitoring instrument; and a processing unit communicatively coupled with the network port and the instrument port, wherein the processing unit is configured for determining whether the packet belongs to a network flow that is desired to be monitored based at least in part on one or more information in a control plane, and passing the packet to the instrument port if the packet belongs to the network flow.

Optionally, the processing unit is further configured for determining the network flow that is desired to be monitored.

Optionally, the processing unit is configured for determining the network flow based on a hash value computed using one or more packet attributes.

Optionally, the processing unit is configured for determining the network flow based on a first flow selection criterion for a data path and a second flow selection criterion for a control path.

Optionally, the processing unit is configured for receiving additional packets for the network flow, and passing all of the additional packets to the instrument port.

Optionally, the processing unit is configured for determining whether the packet belongs to the network flow that is desired to be monitored based on a 5-tuple.

Optionally, the processing unit is configured for determining whether the packet belongs to the network flow that is desired to be monitored based on one or more of a station address, a VLAN ID, and a MPLS tunnel ID.

Optionally, the processing unit is configured for determining whether the packet belongs to the network flow that is desired to be monitored based on a MPLS label stack comprising one or more MPLS label identifiers.

Optionally, the processing unit is configured for determining whether the packet belongs to the network flow that is desired to be monitored based on a calling number, a called number, a call identifier, or an information associated with the control protocol.

Optionally, the processing unit is configured for determining whether the packet belongs to the network flow that is desired to be monitored based on one or more information in a GTP control protocol, a SIP control protocol, a H323 control protocol, or a Megaco protocol.

Optionally, the processing unit is configured for determining whether the packet belongs to the network flow that is desired to be monitored based on one or more of IMSI, MSISDN, IMEI, and APN information.

Optionally, the processing unit is configured for determining whether the packet belongs to the network flow that is desired to be monitored based on a first flow selection criterion for a data path and a second flow selection criterion for a control path.

Optionally, the processing unit is configured to pass the packet to the instrument port in an out-of-band configuration.

A computer product includes a non-transitory medium storing instruction, an execution of which causes a method to be performed by a network switch appliance comprising a network port and an instrument port for communication with a network monitoring instrument, the method comprising: determining whether a packet received at the network port belongs to a network flow that is desired to be monitored based at least in part on one or more information in a control plane; and passing the packet to the instrument port if the packet belongs to the network flow.

A method for sampling packets for a network flow includes: receiving a packet at a network port of a network switch appliance, the network switch appliance comprising an instrument port for communication with a network monitoring instrument; determining whether the packet belongs to a network flow that is desired to be monitored, wherein the act of determining whether the packet belongs to the network flow that is desired to be monitored is performed based on a first flow selection criterion for a data path and a second flow selection criterion for a control path using a processing unit; and passing the packet to the instrument port if the packet belongs to the network flow.

Optionally, the act of determining whether the packet belongs to the network flow that is desired to be monitored is performed based on one or more information in a GTP control protocol, a SIP control protocol, a H323 control protocol, or a Megaco protocol.

Optionally, the act of determining whether the packet belongs to the network flow that is desired to be monitored is performed based on one or more information of IMSI, MSISDN, IMEI, and APN information.

An apparatus includes: a network port for receiving a packet; an instrument port for communication with a network monitoring instrument; and a processing unit communicatively coupled with the network port and the instrument port, wherein the processing unit is configured for determining whether the packet belongs to a network flow that is desired to be monitored based on a first flow selection criterion for a data path and a second flow selection criterion for a control path, and passing the packet to the instrument port if the packet belongs to the network flow.

Optionally, the processing unit is configured for determining whether the packet belongs to the network flow that is desired to be monitored based on one or more information in a GTP control protocol, a SIP control protocol, a H323 control protocol, or a Megaco protocol.

Optionally, the processing unit is configured for determining whether the packet belongs to the network flow that is desired to be monitored based on one or more of IMSI, MSISDN, IMEI, and APN information.

A computer product includes a non-transitory medium storing instruction, an execution of which causes a method to be performed by a network switch appliance comprising a network port and an instrument port for communication with a network monitoring instrument, the method comprising: determining whether a packet received at the network port belongs to a network flow that is desired to be monitored based on a first flow selection criterion for a data path and a second flow selection criterion for a control path; and passing the packet to the instrument port if the packet belongs to the network flow.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
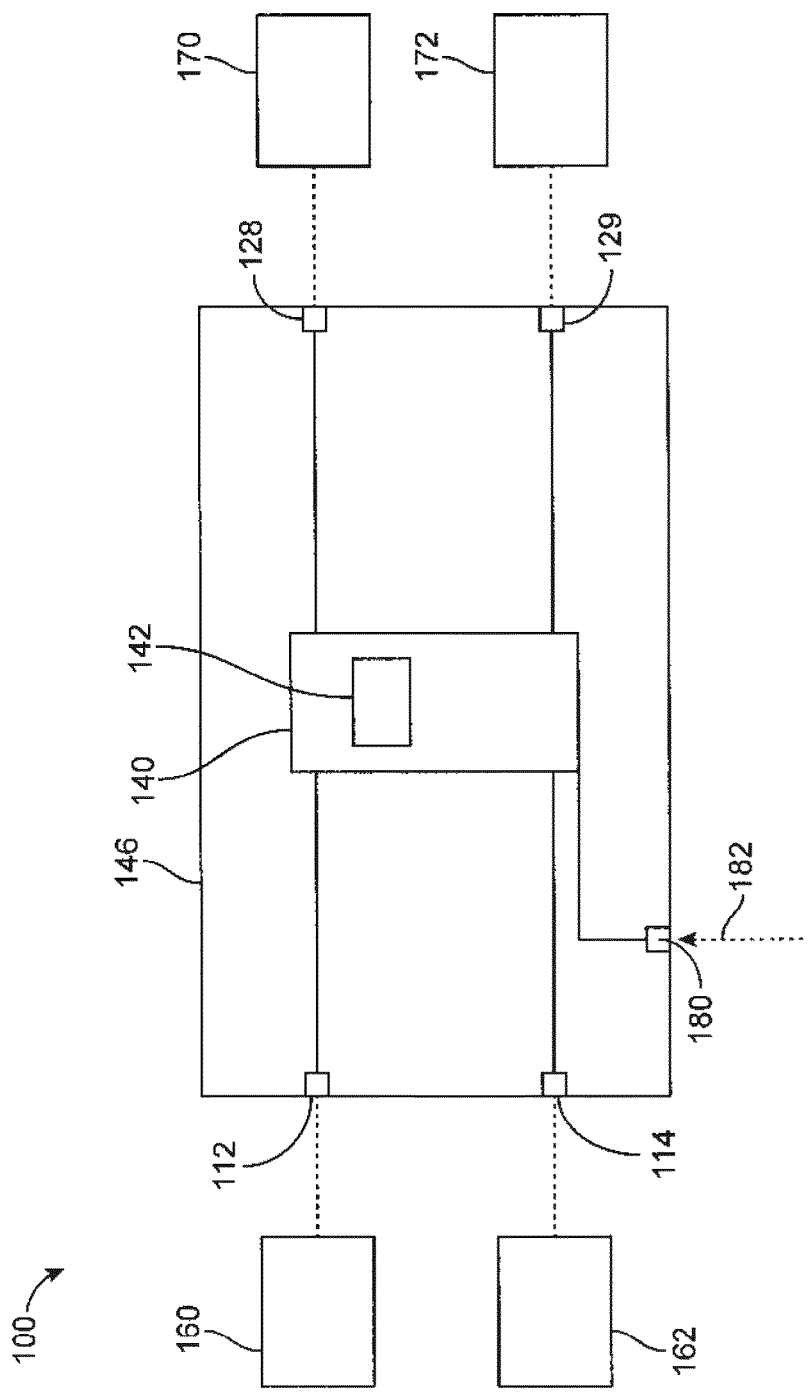
FIG. 1 illustrates a network switch appliance in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

FIG. 1 illustrates a network switch appliance/device 100 in accordance with some embodiments. The network switch device 100 includes a first network port 112, a second network port 114, a first instrument port 128, and a second instrument port 129. The device 100 also includes a packet switch (switch module) 140 with a processing unit 142, a processor 144, and a network switch housing 146 for containing the packet switch 140 and the processor 144. In the illustrated embodiments, the device 100 also includes other components, such as a Network PHY (not shown) coupled to each of the respective ports 112, 114, wherein the Network PHYs may be considered to be parts of the packet switch 140. Alternatively, the Network PHYs may be considered to be components that are separate from the integrated circuit 140. The PHY is configured to connect a link layer device to a physical medium such as an optical fiber, copper cable, etc. In other embodiments, instead of the PHY, the device 100 may include an optical transceiver, or a SERDES, etc. The housing 146 allows the device 100 to be carried, transported, sold, and/or operated as a single unit. The ports 112, 114, 128, 129 are located at a periphery of the housing 146. In other embodiments, the ports 112, 114, 128, 129 may be located at other locations relative to the housing 146. Although two network ports 112, 114 are shown, in other embodiments, the device 100 may include more than two network ports. Also, although two instrument ports 128, 129 are shown, in other embodiments, the device 100 may include only one instrument port, or more than two instrument ports.

During use, the first network port 112 of the device 100 is communicatively coupled (e.g., via a network, such as the Internet) to a first node 160, and the second network port 114 is communicatively coupled (e.g., via a network, such as the Internet) to a second node 162. In some embodiments, the device 100 is configured to receive packets from nodes 160, 162 via the network ports 112, 114. Alternatively, or additionally, the device 100 may be configured to communicate packets between the first and second nodes 160, 162 via the network ports 112, 114. Also, during use, the instrument ports 128, 129 of the device 100 are communicatively coupled to respective instruments 170, 172. The instruments 170, 172 may be directly coupled to the device 100, or communicatively coupled to the device 100 through the network (e.g., Internet). In some cases, the device 100 is provided as a single unit that allows the device 100 to be deployed at a single point along a communication path. In the illustrated embodiments, the packet switch 140 is configured to receive packets from nodes 160, 162 via the network ports 112, 114, and process the packets in accordance with a predefined scheme. For example, the packet switch 140 may pass packets received from one or more nodes to one or more instruments that are connected to respective instrument port(s) 128, 129. In some embodiments, one or more of the network ports 112, 114 may be configured to receive normal packets (e.g., packets not from a virtualized network), as well as virtualized packets (e.g., packets with tunnel format that includes encapsulation of the original packets resulted from virtualization technology). In other embodiments, one or more the network ports 112, 114 may be configured to receive only non-virtualized packets. In further embodiments, one or more the network ports 112, 114 may be configured to receive only virtualized packets.

In one or more embodiments, the packet switch 140 may be any switch module that provides packet transmission in accordance with a pre-determined transmission scheme. In some embodiments, the packet switch 140 may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the instrument may be a pass-through device (i.e., it can receive packets, and transmit the packets back to the device 100 after the packets have been processed), such as an intrusion prevention system. In other embodiments, the packet switch 140 may be configured such that the packets may be transmitted in a one-to-many configuration (i.e., from one network port to multiple instrument ports). In other embodiments, the packet switch 140 may be configured such that the packets may be transmitted in a many-to-many configuration (i.e., from multiple network ports to multiple instrument ports). In further embodiments, the packet switch 140 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the device 100 so that the packets (or certain types of packets) are routed according to any one of these configurations. In some embodiments, the packet movement configuration is predetermined such that when the device 100 receives the packets, the device 100 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of packet switch 140 that may be used to implement features described herein include any of the commercially available network switch devices, such as GigaVUE™, that is available at Gigamon LLC. Other examples of packet switch 140 that may be used to implement features described herein are described in U.S. patent application Ser. Nos. 12/148,481, 12/255,561, 11/123,273, 11/123,465, and 11/123,377, the entire disclosure of all of which is expressly incorporated by reference herein.

In accordance with some embodiments, the packet switch 140 may have the functionalities of a conventional packet switch except that it provides visibility into various parts of a network. Thus, embodiments of the packet switch 140 may operate like a conventional managed packet switch, but providing packet monitoring function. This is accomplished by configuring the packet switch 140 to operate as a circuit switch under certain circumstances. In some embodiments, the configuring of the managed packet switch may be performed by utilizing a CPU interface of the switch to modify appropriate registers in the switch to allow for the desired operation. Also, in some embodiments, the packet switch 140 may be an "out-of-band" network switch, which is configured to obtain packets and pass them to an instrument or to a network that is different from that associated with the original intended destination of the packets.

Also, the term "out-of-band" device/switch refers to a device that is not involved in a transmission of a packet (that is transmitted from node 1 and intended for reception by node 2) to the intended receiving node 2. In some cases, a device may be both an in-band device and an out-of-band device with respect to processing different packets. For example, the network switch device 100 may be an in-band device if it receives a packet (intended for transmission from node 1 to node 2) from a network, and passes the packet back to the network (e.g., after the packet has been processed by a pass-through monitoring tool) for transmission downstream to the node 2. The same network switch device 100 may also be an out-of-band device if it receives another packet from the network, and does not pass the packet back to the network for transmission to the intended receiving node.

It should be noted that the packet switch 140 that may be used with the device 100 is not limited to the examples described above, and that other packet switches 140 with different configurations may be used as well. Also, in one or more embodiments described herein, the packet switch 140 may be implemented using an integrated circuit, such as a processor (e.g., a general purpose processor, a network processor, an ASIC processor, a FPGA processor, etc.). Thus, the term "packet switch" or "switch module" may refer to any circuit that is capable of performing the functions described herein, and should not be limited to a switch or a processor.

In other embodiments, the network device 100 may optionally include an additional processing unit (e.g., a processor) communicatively coupled to the processing unit 142. The additional processing unit may be used to perform additional packet processing, such as header stripping, in some embodiments. For example, in some embodiments, the additional processing unit may be configured to receive only packets with a tunnel format, such as that used in a virtualized network. In one implementation, the processing unit 142 or the packet switch 140 is configured to pass all packets with a tunnel format to the additional processing unit, and does not pass packets without any tunnel format (e.g., packets that are not associated with a virtualized network) to the additional processing unit. Upon receiving a packet with a tunnel format, the additional processing unit then removes one or more headers from the packet. By means of non-limiting examples, the additional processing unit may be configured to remove an outer MAC header, an outer IP header, an outer UDP header, or any combination of the foregoing, from the packet. In some embodiments, after the additional processing unit performs header stripping on the packet, the additional processing unit then passes the packet back to the packet switch 140. The packet switch 140 then transmits the packet to one or more of the instrument ports 128, 129 according to a pre-determined transmission scheme (e.g., one-to-one, one-to-many, many-to-one, many-to-many, etc.) as discussed previously. In other embodiments, in addition to performing packet stripping, the additional processing unit may also be configured to perform other packet processing functions on the received packet. In some embodiments, the additional processing unit may be located outside the housing of the network device 100. In other embodiments, the additional processing unit may be a part of the packet switch 140. For example, the additional processing unit may be considered to be a part of the processing unit 142. Also, in some embodiments, the additional processing unit may be a general purpose processor, a network processor, an ASIC processor, a FPGA processor, or any of other types of processor. In other embodiments, the additional processing unit may be any hardware, software, or combination thereof.

In the illustrated embodiments, the processing unit 142 is illustrated as a component of the packet switch 140. In other embodiments, the processing unit 142 may be a separate component from the packet switch 140. The processing unit 142 may be implemented using a processor, such as a general processor, a network processor, an ASIC processor, a FPGA processor, etc. In other embodiments, the processing unit 142 may be a field processor. In further embodiments, the processing unit 142 may be a network card. The processing unit 142 may be implemented using one or more processors, wherein one or more of the processors may be considered to be a part of the network switch device 100 or not. Also, in some embodiments, the packet switch 140 may include ternary content-addressable memory (TCAM). The packet switch 140 may be configured to perform various packet processing functions, included but not limited to packet filtering, packet routing, packet switching, packet mirroring, packet aggregation, etc.

As shown in the figure, the network switch device 100 further includes a port 180 for receiving configuration information 182 to thereby configure the packet switch 140 (e.g., the processing unit 142 in the packet switch). In some embodiments, the port 180 may be a separate and different port from the network ports 112, 114. In other embodiments, the port 180 may be a network port, like the network ports 112, 114, or may be implemented using one or both of the network ports 112, 114. In such cases, in addition to receiving the information 182, the port 180 may also receive network traffic that are being communicated between nodes (e.g., nodes 160, 162). Also, in further embodiments, the device 100 may include multiple ports 180 for receiving configuration information 182. In some cases, one or more of the ports 180 may be used to implement the network ports 112, 114, thereby allowing the same port(s) 180 for receiving the configuration information 182 to also receive network traffic.

In some embodiments, the network switch device 100 may be configured to sample all (i.e., 100%) of the packets for a certain network flow. For example, the network switch device 100 may sample all of the packets for 1 flow out of every N network flows. Such feature is advantageous because the entire traffic analysis for a given flow will be accurate and reliable. Thus, the intelligence of overall network monitoring and security performance for the entire network may be inferred based upon the fully detected network monitoring and security performance for the subset or sample of the flows on the network.

Figure 2:
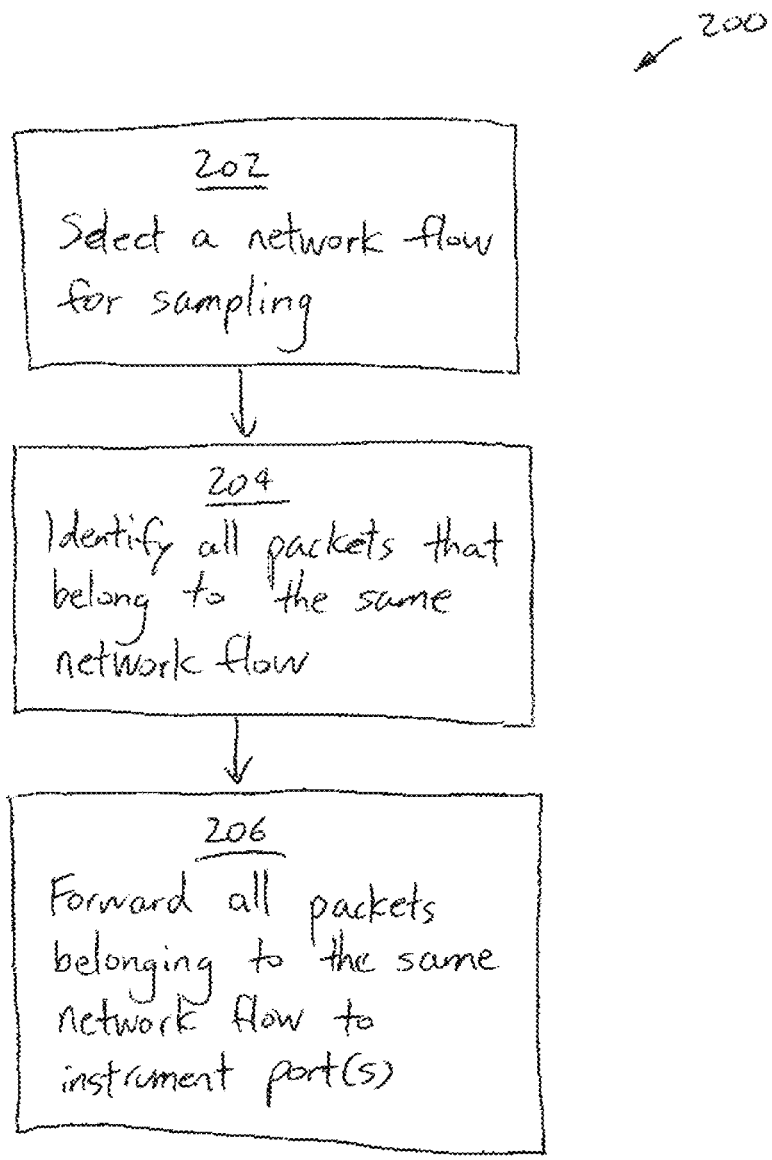
FIG. 2 illustrates a method for sampling packets that belong to a certain network flow.

FIG. 2 illustrates a method 200 for sampling packets that belong to a certain network flow. In some embodiments, the method 200 may be performed by the network switch device 100 (e.g., by the processing unit 142 of the network switch device 100). In other embodiments, the method 200 may be performed by another processing unit. First, the network switch device 100 selects a network flow out of a plurality of network flows for sampling (item 202). For example, the processing unit 142 may be configured to randomly select 1 network flow out of every N network flows that go through the network switch device 100. In other embodiments, the selection of the network flow for monitoring may be performed using a round robin technique. In further embodiments, a hash computation may be performed on one or more attributes (e.g., VLAN, station information, tunnel information, 5-tuple, etc.) of the packets, and the hash value may be used to select certain network flow for monitoring. In still further embodiments, the processing unit 142 may be configured to perform control plane processing, and to correlate certain attributes that identify a user for a certain flow. The processing unit 142 may randomly select from those attributes that define a user.

Once a certain network flow has been selected for monitoring, the network switch device 100 then identifies all packets that belong to the same network flow (item 204), and forwards all such packets to certain instrument port(s) (item 206). One or more network monitoring tools coupled to the instrument port(s) may then receive the packets that belong to the same network flow, and analyze such packets. Thus, the network switch device 100 keeps track of the selected network flow, and only accepts and forwards packets that are determined to be a member of the network flow selected for monitoring.

Various techniques may be employed by the network switch device 100 to select and/or identify certain network flow for monitoring. For example, in some embodiments, the processing unit 142 of the network switch device 100 may be configured to select and/or identify certain network flow based on a station address, VLAN ID, MPLS tunnel ID, or combination of the foregoing. In one implementation, the processing unit 142 determines a station address, VLAN ID, or MPLS tunnel ID, as a flow selection criterion. The processing unit 142 then uses that information to determine if a network flow including that packet is to be sampled or not. For example, the processing unit 142 may use a random/ hash/round robin selection and choose packets (with certain VLAN, station address, tunnel information, etc.) to sample or not. The processing unit 142 may then extract that attribute from each subsequent packet and determines if the subsequent packet is a member of a flow being sampled or not.

Also, in some embodiments, the processing unit 142 may use IP address from one or more ranges of IP address as a network flow selection criterion. For example, a user station may be assigned an IP address from a range or known ranges of IP addresses. The processing unit 142 examines both IP addresses (source IP address and destination IP address) and determines if one of them is within one of the predefined ranges. For example, the processing unit 142 may be configured to look at IP address ranges (X1 through X2, X3 through X4, etc.), and may compare each of the two IP addresses in the packet to each of the ranges. If one of the IP addresses is in the range, then the processing unit 142 may determine that the packet has a network flow identifier that is a part of the population of flows, and therefore, the packet is a part of the "population" to be sampled. In one implementation, the processing unit 142 determines which address (the source IP address or the destination IP address) represents a user so that once a potential user is found in the packet, it can be compared against a table containing all the users, and determines if the user in this packet is one to be sampled or not. The processing unit 142 may employ an algorithm that caches all items in a table representing the population. The processing unit 142 then selects 1 out of N to be sampled. The above technique allows the processing unit 142 to sample all of the packets for a given user from a population of many users. In further embodiments, the criterion for selecting a network flow for monitoring may include a MPLS tag that identifies a population variable.

In other embodiments, a flow criteria may be based on a 5-tuple (e.g., IP protocol, source IP address, destination IP address, source port, and destination port). In some cases, the 5-tuple may be attributes from an IP packet with TCP/ UDP protocol. In such cases, the source port and the destination port may be UDP/TCP source port and UDP/ TCP destination port, respectively. In some embodiments, determines a 5-tuple as a flow selection criterion. The processing unit 142 then uses that information to determine if a packet belongs to that flow in order to determine if the network flow including that packet is to be sampled or not. The processing unit 142 may then extract that attribute (the 5-tuple) from each subsequent packet and determines if the subsequent packet is a member of a flow being sampled or not. In one implementation, a hash value may be determined using the 5-tuple, and the processing unit 142 may calculate a hash value for each subsequent packet to determine if the subsequent packet belongs to a flow being sampled or not.

In some embodiments, a network flow may involve a control plane protocol. A control plane protocol may have certain user identifiable attributes and data plane identifiable attributes. In some embodiments, the processing unit 142 is configured to use the user identifiable attributes to determine which control/data plane packets define the population of the sample of network flows. The data plane protocol does not contain any user identifiable attributes. However, the association/correlation performed by the processing unit 142 allows the processing unit 142 to choose the appropriate packets in the data plane which are included in the sample, and also choose those appropriate packets which are not in the sample.

In other embodiments, the processing unit 142 of the network switch device 100 may utilize a control plane protocol which identifies a correlation between a user identifier (phone number, user name, subscriber identifier, etc) and the associated network flow for monitoring. For example, SIP is a control protocol used in Voice Over IP that contains textual fields identifying a user initiating a call and a user to be called. It also contains information that identifies the end stations that will contain the RTP streams used to carry the voice of a call. The IP Addresses of the devices that send/receive packets and participate in the SIP portion of VoIP may be different from the IP Addresses of the devices that send/receive packets containing the voice portion of the VoIP call. When sampling the "call", all of the packets for SIP and the RTP need to be sampled to represent 100% of the traffic for that 1 network flow. So SIP is the control plane and RTP is the data plane in the above example. In some embodiments, the processing unit 142 may use one or more attributes in the control plane protocol as the flow selection criteria for "control path" and one or more attributes in the control plane protocol that are used as the flow selection criteria for the "data path" These collective criteria and associated flow identifiers may be stored (e.g., in a non-transitory medium associated with the network switch device 100) so that packets that are data plane packets will be compared against the flow criteria for data path, and those control plane packets are compared against the flow selection criteria for the control path to determine if the packet belongs to a certain network flow. If so, then the network switch device 100 samples it for monitoring and passes the packet to one or more of the instrument ports.

It should be noted that the SIP is one of many possible control protocols, and therefore other control protocols and data protocols may be associated in a similar manner in other embodiments.

Stateful Sampling

In further embodiments, the processing unit 142 may be configured for determining whether the packet belongs to the network flow that is desired to be monitored based on one or more information in a control protocol, such as a GTP control protocol. By means of non-limiting examples, the one or more information may include one or more of IMSI, MSISDN, APN and IMEI. By means of non-limiting examples, IMSI may include any information regarding a SIM card, such as a SIM card number. Also, by means of non-limiting examples, MSISDN may include one or more of a mobile subscriber ISDN and phone number. APN may include any information regarding a category of user, such as devicetype.carrier.com, devicemfg.mobile-carrier.com, service-class.carrier.com, etc. IMEI may include any information regarding a particular mobile device, such as a manufacturer identification, a model number, etc., or a combination of the foregoing. In some embodiments, a GTP Protocol may be a control protocol containing many different user identifiable and data path identifiable attributes. The user definable attributes may be used by the processing unit 142 as population variables in the method of FIG. 2. For example, in some embodiments, the processing unit 142 may be configured to use one or more of those user definable attributes to select a sample of the population. Then the data path identifiable attributes contained in the GTP Protocol which define the data path may then be used by the processing unit 142 to choose the data path packets to send to the instrument port. It should be noted that the data path protocols do not have any user definable information contained therein. Therefore, the correlation between the user definable attributes and the data path identifiable attributes for sampling is required. Other control plane protocols, including but not limited to SIP, Megaco, H.323, etc., exhibit similar characteristics (e.g., the control plane protocols may include IMSI, MSISDN, APN and IMEI, and any other custom mobile identifiers that could be utilized to associate and correlation information), and therefore the processing unit 142 may be similarly configured to operate on any of these protocols in a similar manner.

In some embodiments, the processing unit 142 may be configured to perform flow-based sampling for different percentages of subscribers based on any of the above mentioned information. For example, when performing flow-based sampling based on APN information, the processing unit 142 may be configured to sample data received at the network switch device 100 for 20% of the subscribers for any device that corresponds to APN information devicetype1.carrier1.com, and to sample data received at the network switch device 100 for 100% of the subscribers for any device that corresponds to APN information devicemfg1.Carrier1.com. Following the above example, if the network switch device 100 receives data for five subscribers S1, S2, S3, S4, S5 that use device type 1 with carrier 1 being the service provider, then the processing unit 142 may select one of such subscribers (e.g., S2), and then all data for this selected subscriber S2 received at the network switch device 100 will be sampled, and be sent to one or more network monitoring instruments through one or more instrument ports at the network switch device 100. Alternatively, instead of sampling all data for the selected subscriber S2, certain types of data may be sampled for the selected subscriber S2.

Also following the above example, if the network switch device 100 receives data for three subscribers S6, S7, S8 that use phones manufactured by manufacturer 1 with carrier 1 being the service provider, then the processing unit 142 may select all of these subscribers (100% of the subscribers) and the all data for these subscribers received at the network switch device 100 will be sampled, and be sent to one or more network monitoring instruments through one or more instrument ports at the network switch device 100.

Also, in some embodiments, the processing unit 142 may be configured to perform flow-based sampling based on user-prescribed protocol information, e.g., information regarding L3 and/or L4 protocol, etc. In addition, in some embodiments, the processing unit 142 may be configured to perform flow-based sampling at different sampling rates based on different types of traffic. For example, the processing unit 142 may be configured to sample 10% of the HTTP traffic, and 80% of the video traffic.

In one or more embodiments described herein, the processing unit 142 may be configured to identify a population of network flows using network flow information (e.g., a 5-tuple flow identifier, a station address, a VLAN ID, and a MPLS tunnel ID, a MPLS (Multi-Protocol Label Switching) label stack comprising one or more MPLS label identifiers, a calling number, a called number, a call identifier, an information associated with a control protocol, information in a GTP control protocol, information in a SIP control protocol, information in a H323 control protocol, information in a Megaco protocol, information in other control protocol, IMSI, MSISDN, and MEI). In some cases, one or more of such information defines the population of network flows. After the population of network flows has been identified, the processing unit 142 may then select one of the network flows in the identified population for monitoring (e.g., for forwarding to associated packets to the instrument port(s)). For example, the processing unit 142 may use a random selection technique, a round-robin technique, a hashing algorithm, or any of other techniques for selection of the network flow for sampling.

In some embodiments, the processing unit 142 of the network switch device 100 may be configured to change a monitored user group at some pre-defined frequency (e.g., change sampled users once every day, every N number of hours, etc.). In such cases, the processing unit 142 of the network switch device 100 may be configured to flush certain % of the active sample from the sample set at certain programmable periodic interval. For example, a user may selectively configure the processing unit 142 to flush 5% of the sample database every 8 hours, to flush 25% of the sample database every 24 hours, etc. In some embodiments, the percentage to be flushed may be selectively chosen to be anywhere from 1 to 100%, and the periodic interval may be selectively chosen to be anywhere from 1 minute to 24 hours.

Also, in some embodiments, a user configuring the network switch device 100 to perform stateful sampling may be allowed to specify a range of IMEI, a range of IMSI, a range of APN, wildcard entries, etc. In some cases, multiple ranges or entries with wildcard entries may be allowed. In addition, in some cases, a user may be allowed to exclude certain entries from the wildcard entries and/or range entries. In some embodiments, all or a subset of the entries may be assigned a user-configured sampling rate. In one implementation, a default sampling rate (e.g., 10%) may be set. Once the range of subscribers defined by IMEI, IMSI, or APN, etc., are specified, the processing unit 142 can then sample based on user-configurable options that are based on IMEI, IMSI, or APN, etc. Also, in some embodiments, based on the user configuration, the processing unit 142 can load-balance the sampled traffic across a group of network monitoring instruments. For example, in one implementation, the load-balancing may be performed by the processing unit 142 using IMEI, IMSI, MSISDN information as the key.

In some embodiments, the processing unit 142 may implement an idle timeout for the sampling. For example, if the idle timeout is set to be 30 minutes, then if the processing unit 142 determines that no packets for a certain session has been received for the last 30 minutes, the processing unit 142 then removes the session from the active sampling database, and may select a new active subscriber for tracking and sampling.

In addition, in some embodiments, the processing unit 142 may be configured to gather statistics for reporting to users. For example, from the sampling session, the processing unit 142 may gather information regarding total number of bytes sampled, total number of packets sampled, packet rate, life of a sampled subscriber device (when was it included in the sampling database), errored packets, any packet drop, time when a packet related to the session was seen, timeout details, etc. The gathered statistics may be stored in a non-transitory medium in some embodiments.

Monitoring LTE and GPRS

Figure 3:
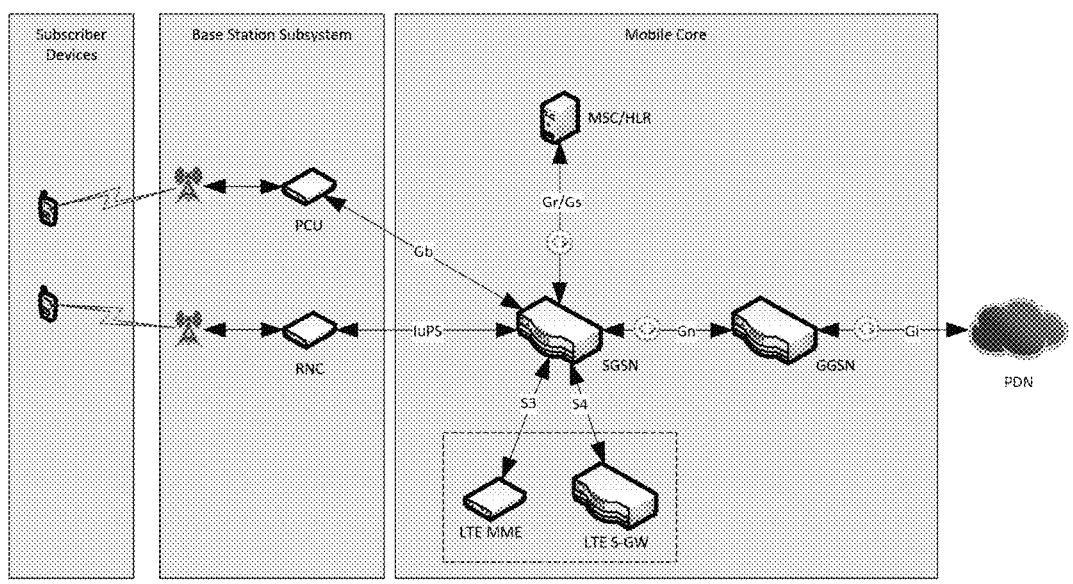
FIG. 3 illustrates a network having a mobile core.

FIG. 3 illustrates a network having a mobile core, particularly showing stateful sampling for monitoring LTE (Long Term Evolution—e.g., 4G) and GPRS (General Packet Radio System) networks. The SGSN (Serving GPRS Support Node) provides authentication and registration of subscriber devices to the core network, while the GGSN (Gateway GPRS Support Node) maintains interconnectivity of subscriber devices to the internet. Communication between SGSN and GGSN is tunneled using GTP (GPRS Tunneling Protocol) to tunnel subscriber device packets to the GGSN for accessing the internet. As shown in the figure, the mobile core includes different network devices that are in communication. For example, the SGSN is illustrated as communicating with MSC/HLR. The communication link between two devices has a circular symbol that represents the communication link being accessed by the network switch device 100 (or multiple network switch devices 100). As shown in the example, the network switch device(s) 100 may be configured to tap into the various network communications between different network devices in the packet core.

In some embodiments, the network switch device 100 is configured to perform load-balancing on subscriber-ID. This feature may involve stateful inspection of GTP where specific parameters in the control traffic (e.g., GTPv1-c traffic) may be used to correlate to corresponding GTPv1-u flows. GTPv1-C is the GTP Version 1 Control Plane protocol. GTPv1-U is the GTP Version 1 User Plane (or Data Plane) protocols. GTP-C contains the control plane elements (IMEI, IMSI, MSISDN, APN, TEID to be used by GTP-U) and the GTP-U contains the TEID identified in the GTP-C protocol exchanges. The stateful processing makes decisions based upon the values in GTP-C and then tells the load balancer, flowvue sampling or filtering function to process the associated GTP-U tunnel (TEID) accordingly.

Also, in some embodiments, the processing unit 142 of the network switch device 100 may use GTP-C to register user data sessions between the SGSN and GGSN. Parameters that may be used to uniquely identify the subscriber device include IMSI, IMEI, APN, MSISDN, GTP-U tunnel ID, etc. IMSI number may be used to identify a certain subscriber, and this number is stored on a SIM card. GTP-C is used for signaling between GGSN and SGSN, which allows the SGSN to activate a session on a user's behalf, to deactivate a session, or to update a session. GTP-U is used for carrying user data within the GPRS core network. IMEI may be used to identify a device and has no permanent or semi-permanent relation to the subscriber. APN may have two components—a network identifier and an operator identifier. A mobile device making a data connection is configured with an APN to present to the carrier. The carrier will examine this identifier to determine what type of network connection should be created (e.g., what IP address should be assigned to the wireless device, what security method should be used, how or if the device should be connected to a private customer network, etc.). The network identifier defines the external network to which the GGSN (Gateway GPRS Support Node) is connected. Optionally, it may also include the service requested by the user. The operator identifier defines the specific operator's packet domain network in which the GGSN is located. This identifier is optional. In some cases, a mobile network operator may be uniquely identified by the MCC (a mobile country code) and the MNC (a mobile network code). MSISDN may include a telephone number, and it may be sent out during tunnel negotiations. The GTP-U tunnel ID (aka GTP-U TEID) may be negotiated as part of the initial GTPv1-c exchange. This tunnel-ID may subsequently be used for all future data communication relative to the session.

In some embodiments, a user configuring the network switch device 100 may be allowed to specify an incoming stream (e.g., all of it) or a range of subscribers identified by IMEI, IMSI, APN, etc., information that need to be load-balanced.

In some embodiments, the network switch device 100 may be configured to perform filtering and load-balancing based on subscriber-ID (e.g., IMSI, IMEI, MSISDN, etc., if present). For example, the processing unit 142 may be configured to analyze the packets received at the network switch device 100 to determine whether certain packets belong to the same subscriber for sampling. The processing unit 142 may also determine which instrument port(s) to send the packets based on the subscriber-ID. In some cases, load-balancing key may be different from the criteria for defining a set of subscribers that is desired to be monitored (e.g., "interesting" subscribers). Also, in some embodiments, the network switch device 100 may use IMEI as the load-balancing key.

The processing unit 142 may also be configured to monitor different interfaces, such as S3 and S4 interfaces, and Gn interface. The S3 interface enables mobility between 3G GPRS and LTE networks when LTE devices roam into 3G GPRS coverage area. It is the control plane interface between the MME (Mobility Management Entity) and the SGSN using GTP-c to establish bearer sessions between the SGSN and the S-GW (Serving Gateway), which is used to manage bearer sessions contained on the S4 interface. The MME handles control plane processing of the LTE core, GSM Mobile core, and its associated roaming interface partners. The Gn interface (a network interface between the SGSN and GGSN) contains GTP-C and GTP-U protocols between the SGSN and GGSN. The Gn interface is analogous to the S5/S8 and S1-U interface in that these interfaces carry GTP-C and GTP-U packet data to be correlated and processed accordingly by the GTP correlation element of one or more embodiments described herein. The SGW is configured to aggregate traffic from the eNode_B at all cell sites into the LTE Core network. The GTP-C is used to communicate control to register user data sessions between the SGSN and GGSN. The GTP-C contains IMSI and IMEI to identify the subscriber device and identifies the GTP-U tunnel ID allocated for the data session to be used for subscriber traffic carried to the GGSN.

In some embodiments, the network switch device 100 may be configured to maintain a stateful database for any subscribers identities to be filtered and/or load balanced, and to extract the corresponding tunnel ID information (from control plane data) for filtering and/or load-balancing respective data plane traffic. For example, the maintaining of the stateful database may be accomplished by the processing unit 142 based on input of IMSI and/or MSISDN in some embodiments.

In some embodiments, the network switch device 100 may be configured to filter and load-balance based on subscriber-ID (e.g., IMSI, IMEI, APN, MSISDN, etc., if available). Such subscriber-ID may be correlated to the tunnel ID that will be used in all subsequent data communications relative to the particular user. Also, in some embodiments, the processing unit 142 of the network switch device 100 is configured to pass all control and data traffic for a particular subscriber being sampled to the same instrument port. Since smartphones are always on, the GTP sessions may not be terminated explicitly. In some embodiments, the processing unit 142 may be configured to detect a filtered (possibly defunct) tunnel ID reused by other subscribers, since there will not be an explicit GTP tunnel delete action to be seen. Also, there is a possibility of having multiple GTP tunnels for the same subscriber-ID. Thus, in some embodiments, the network switch device 100 may be configured to perform filtering/load-balancing to handle this scenario and to make sure that all the control and data traffic across multiple tunnels are sent to the same instrument port. In addition, in some embodiments, all sessions related to the same subscriber spreading across different interfaces (e.g., S3, S4 interfaces) may be identified by the processing unit 142, and be sent to the same instrument port.

Also, in some embodiments, the network switch device 100 may be configured to distribute the subscribers evenly across multiple instrument ports in the load-balance group based on subscriber-ID. For example, if there are 10 subscribers that are being monitored, and there are 2 instrument ports assigned for these 10 subscribers, then each of the 2 instrument ports may be configured to receive packets for 5 subscribers. In such cases, all the traffic (including control and data/bearer messages) related to a subscriber will be sent to the same instrument port. Alternatively, all GTP-c traffic may be forwarded by the network switch device 100 to a number of instrument ports while the user-plane sessions are evenly distributed across the instrument ports, making sure that all the user-plane sessions for a subscriber are always passed to the same instrument port.

In some embodiments, the processing unit 142 of the network switch device 100 may be configured to detect a hardware failure of a probe, and readjust the traffic distribution accordingly when performing load distribution. For example, in some cases, the processing unit 142 may detect instrument failure, and may distribute the subscribers (that were bound to the failed instrument/instrument port) evenly across the rest of the instrument ports (or across a subset of available instrument ports) in response to the detected instrument failure, while keeping the integrity of the individual subscriber sessions (e.g., making sure that all the traffic related to a subscriber are sent to the same instrument port). Alternatively, the processing unit 142 may be configured to detect instrument failure, and to failover all the subscriber sessions to the next instrument port in response to a detected instrument failure. Various techniques may be employed by the processing unit 142 to detect instrument failure. In some embodiments, the processing unit 142 may be configured to monitor the physical connection to an instrument connected to an instrument port. In one implementation, the network switch device 100 may be configured to transmit "keep-alive" messages to an instrument (e.g., ICMP request/response exchanges, or a user-customizable request/response exchanges). The processing unit 142 is configured to keep track of responses (from the instruments) to the requests. If the network switch device 100 fails to receive responses within a user-configurable number of retries, the processing unit 142 may determine that a failure has occurred. In other embodiments, an instrument communicating with the network switch device 100 through the instrument port may be configured to send a keep-alive message at periodic intervals to indicate health. In such cases, a failure for the network switch device 100 to receive these keep-alive messages within a user-specified timeout interval and/or within a number of retry attempts may be considered by the processing unit 142 as an instrument failure.

Also, in some embodiments, the processing unit 142 may be configured to assign weights to influence distribution of packets to the instrument ports. For example, in some embodiments, each instrument port may have a default weight assigned to it. In other embodiments, the processing unit 142 may receive an input from a user to configure a weight for a certain instrument port. The weight assigned for the instrument port would influence the distribution of subscribers to the instrument port.

In some embodiments, the processing unit 142 may be configured to load-balance packets across different instrument ports. In other embodiments, the processing unit 142 may also be configured to load-balance packets across stacking links (that is if there are multiple network switch devices 100 stacked together). Furthermore, in some embodiments, the processing unit 142 may be configured to load-balance based on inner IP and tunnel ID of packets.

In some embodiments, the network switch device 100 may be configured to replicate GTP-c sessions across a number of instrument ports of the load-balancing group.

Also, in some embodiments, the network switch device 100 may be configured to correlate GTP-c sessions to the corresponding tunnels in the user-plane, and to ensure that all the tunnels associated with a subscriber (e.g., identified by IMSI, IMEI, MSISDN, APN info, etc.) are assigned to a certain instrument port.

In some embodiments, the network switch device 100 may start off performing the subscriber-based sampling in a round-robin fashion—i.e., evenly distributing incoming traffic evenly across a group of instrument ports to ensure all the user-plane traffic associated with a subscriber always ends up on the same instrument through the instrument port. In some cases, the processing unit 142 may apply weights to influence the distribution so that it may or may not be evenly distributed.

Furthermore, in some embodiments, the processing unit 142 of the network switch device 100 may be configured to keep count of packets, and execute a re-balance based on user-defined criteria. For example, in some embodiments, a user may input a time criteria (e.g., a time of day, a date, a time interval defined by hours and/or dates, etc.) to the processing unit 142, wherein the re-balance may allowed to occur only during the specified time. In other embodiments, a user may enter a packet count threshold to the processing unit 142. In such cases, the processing unit 142 will perform the re-balance in response to the packet count for packets being transmitted to an instrument port being above the specified threshold. In further embodiments, a user may enter a consumed bandwidth threshold to the processing unit 142. In such cases, the processing unit 142 will perform the re-balance in response to the consumed bandwidth (representing traffic volume) being above the specified threshold. Regardless of the technique used to trigger the re-balancing, in some embodiments, the processing unit 142 may optionally be configured to generate a message for transmission to an instrument to notify the instrument of the re-balancing. For example, the message may be sent to a network monitoring instrument through one of the instrument ports, or to another device through a management port or through an instrument port at the network switch device 100.

In addition, in some embodiments, the processing unit 142 may be configured to gather statistics for reporting to users. For example, from the sampling session, the processing unit 142 may gather information regarding sessions established, corresponding tunnel IDs, total number of bytes sampled, total number of packets sampled, packet rate, state of the session, errored packets, any packet drop, time when a packet related to the session was first seen and/or last seen, life of the session, inner source/destination IP (if available), etc. The gathered statistics may be stored in a non-transitory medium in some embodiments.

Also, in some embodiments, session information (such as any of the information mentioned herein) for sessions that are discovered may be stored in a non-transitory medium. This way, every time the network switch device 100 is rebooted, it will recover session information that was discovered prior to the reboot In some embodiments, the processing unit 142 may be configured to provide stateful filtering/load-balancing in combination with stateless filtering. For example, in some embodiments, the processing unit 142 may be configured to filter packets based on information regarding IMSI, IMEI, MSISDN, APN, etc., and also combine it with APF to filter packets based on protocols, port numbers, etc.

Figure 4:
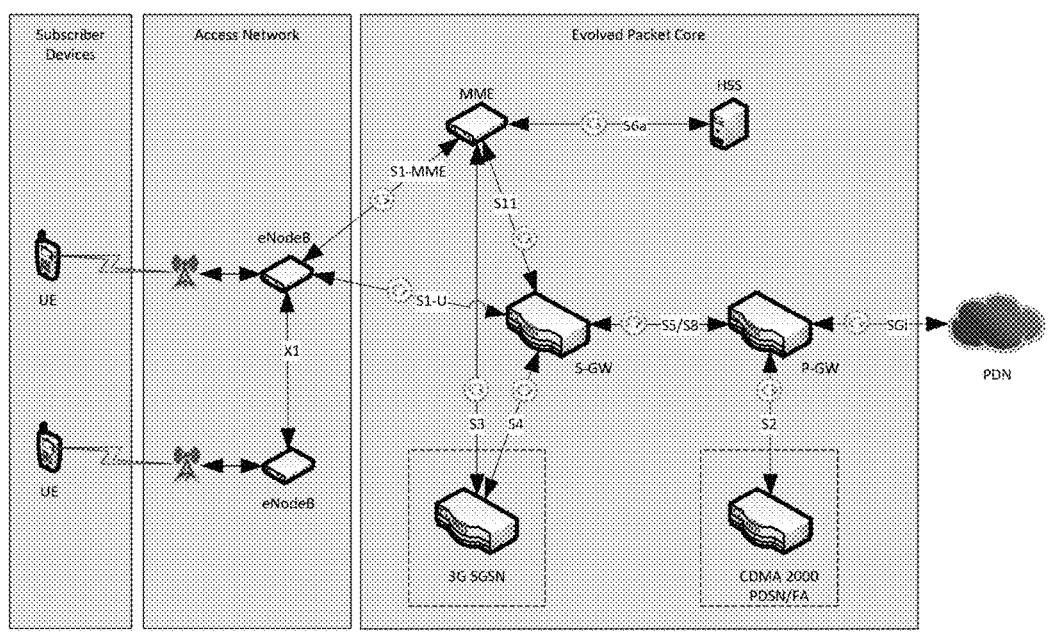
FIG. 4 illustrates a network having a packet core.

The above features may be similarly applied to any network in other embodiments. For example, in other embodiments, the network may have a packet core. FIG. 4 illustrates a network having a packet core, wherein one or more network switch devices 100 provide various interfaces. As shown in the figure, the packet core includes different network devices that are in communication. For example, the MME is illustrated as communicating with HSS. The communication link between two devices has a circular symbol that represents the communication link being accessed by the network switch device 100 (or multiple network switch devices 100). As shown in the example, the network switch device(s) 100 may be configured to tap into the various network communications between different network devices in the packet core.

In some embodiments, the network switch device 100 may be configured to perform filtering and load-balancing such that all control packets and data packets from a flow always end up on the same tool. Load-balancing may be performed based on subscriber identification (e.g., IMSI info, MSISDN info, IMEI info, etc.). Also, in some embodiments, all traffic related to a subscriber should be passed to the same instrument port.

In some embodiments, the network switch device 100 may provide S3 and S4 interfaces for monitoring. The S3 interface enables mobility between 3G GPRS and LTE networks when LTE devices roam into 3G GPRS coverage area. It is the control plane interface between the MME and SGSN using GTP-c to establish bearer sessions between the SGSN and the S-GW, which is used to manage bearer sessions contained on the S4 interface.

The network switch device 100 may also provide S5 and S8 interfaces. The S5/S8 interface enables the EPC to provide gateway of UE data bearer sessions between the S-GW (Serving Gateway) and P-GW (PDN Gateway). The S5/S8 interface uses GTP-C for control and GTP-U for data.

The network switch device 100 may also provide S11 and S1-U interfaces. The S11 interface enables the MME to communicate with the S-GW to manage data bearer sessions in the S-GW for the UE (user equipment, such as phone, GSM card, etc.). The S11 interface uses GTP-C for control plane establishment between the MME and the S-GW.

In some cases, the Serving Gateway receives packets from eNodeB devices in multiple cell sites and then sends appropriate subscriber traffic to the PDN Gateway over the S5/S8 interfaces using GTP-U (after appropriate negotiation and control plan setup using GTP-C). The PDN Gateway receives traffic from the S-GW and sends it to the internet using the SGi interface. Packets returned from internet devices are sent by the PDN-Gateway to the appropriate S-GW which forwards on to the eNodeB which ultimately sends to the UE (mobile phone).

In some embodiments, the network switch device 100 may be configured to provide intelligent sampling. In some cases, to influence randomization in selecting subscribers for sampling, a user may input weights for association to one or more flows. For example, in some embodiments, the weights may be assigned to different respective flows. The weights may provide a preference for certain flows in the selection process, and/or may make certain flows less preferable for selection. Also, in some embodiments, the selection may be performed by the processing unit 142 based on certain monitoring parameters. For example, in some embodiments, the processing unit 142 may examine certain protocols, applications, patterns, or combination of the foregoing, in a traffic stream, and if such information satisfies a certain criteria, then it will trigger the processing unit 142 to perform a selection. In other embodiments, the processing unit 142 may perform a selection based on certain user-defined criteria for capturing "problematic" flows. By means of non-limiting examples, such criteria may include one or more of bandwidth consumption per subscriber, dropped connections, detected microbursts, delay, jitter, latency, packet loss, malformed packets, packet fragments, duplicates, etc.

Also, in some embodiments, a score representing an importance of a flow may be calculated by the processing unit 142, and the processing unit 142 may then use the score to select certain subscriber for sampling. The flows with the highest scores may be selected as part of the active database, while the flows with the lowest scores would be shuffled out of the active database (e.g., once a new flow needs to be added to a fully populated active database). In one implementation, the processing unit 142 may be configured to calculate such score based on a severity of an event. A severity may indicate an amount of threat an event poses. The user may define severity value for these events. For example, dropped packets may be assigned a value of 5, while packet fragments may be assigned a value of 2. Also, in some embodiments, the processing unit 142 may calculate the score based on pre-defined weight for the flow. In further embodiments, the processing unit 142 may determine the score based on a frequency of an event. In still further embodiments, the processing unit 142 may determine the score based on an inactivity timer. In some cases, a user may define a value for indicating inactivity for a certain flow.

In some embodiments, the network switch device 100 may provide session persistence. For example, in some cases, the network switch device 100 may need to be rebooted for maintenance, or may experience network failure due to unexpected network events. In such cases, after the network switch device 100 is restarted and up and running, the network switch device may provide the same session persistency as that before the shut-down. For example, if five of the GTP sessions are load balanced to one of the instrument ports (e.g., to one of the network monitoring instruments), after the network switch device 100 is rebooted, packets for the same 5 GTP sessions will still be sent to the same instrument port to maintain session persistence. In one implementation, session information for sessions that occur within a window of period (e.g., 5 minutes, or other values) may be stored in a non-transitory medium. This window of period is a "moving" period in the sense that the last 5 minutes of the session information will be stored. This way, every time the network switch device 100 is rebooted, it will have session information for the sessions that occur within the last 5 minutes before the reboot occurs.

In some embodiments, the sampling of the packets may be based on user identifications. For example, in some embodiments, if a user specifies a set of member IDs for sampling, then packet traffic related to the specified member credentials will be sampled by the network switch device 100. In other embodiments, instead of specifying a set of member IDS, a certain group may be specified. In such cases, instead of all of the members in the group, the network switch device 100 may sample certain selected members within the group. Such selection may be performed randomly by the network switch device 100, or using other selection schemes.

In one or more embodiments, the network switch device 100 may be configured to participate in two-way communication with network elements to actively query those network elements (e.g., switches, servers, routers, firewalls, network monitoring instruments, etc), as well as to allow those network elements to query information regarding network flows from the network switch device 100.

In one or more embodiments described herein, the network switch device 100 may include a non-transitory medium for storing data associated with the method of FIG. 2. For example, in some embodiments, the non-transitory medium may store statistical information containing packet and bytes counts for all data that correspond to a population of flows. The non-transitory medium may also store statistical information containing packets and bytes for all network flows that are in the sample. In some cases, the non-transitory medium maintains statistical information containing packet and bytes counts for each independent network flow. In further embodiments, the non-transitory medium may store other information associated with network flow(s).

Figure 5:
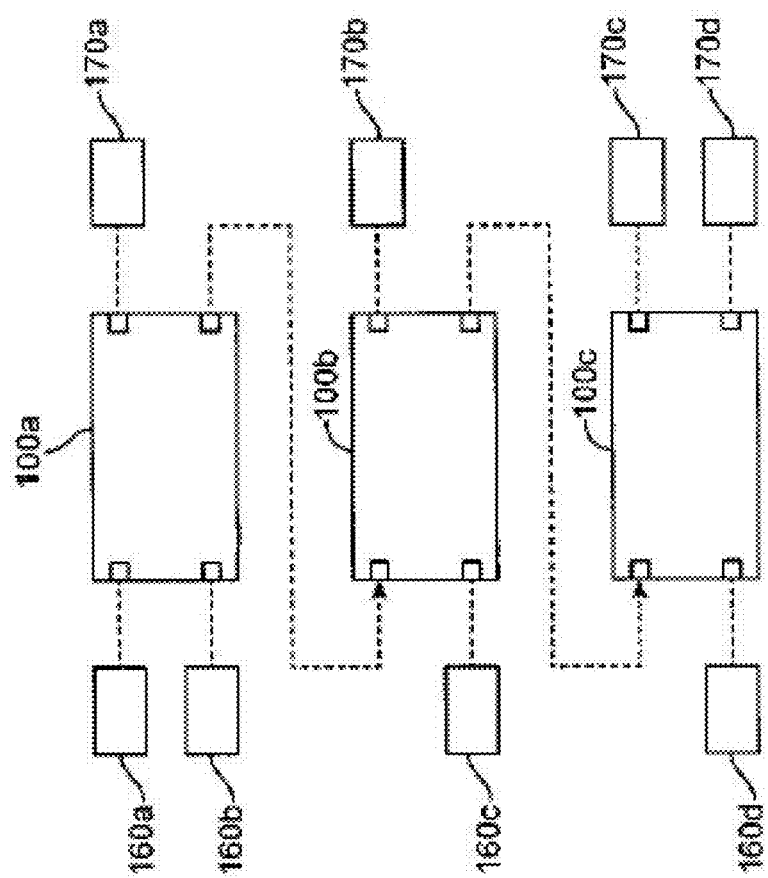
FIG. 5 illustrates a network switch appliance in a stacked configuration with one or more additional network switch appliance(s) in accordance with some embodiments.

In some embodiments, the method 200 may be performed by a plurality of network switch devices 100 that are stacked together. Also, in some embodiments, any of the above features that is described as being performed by the network switch device may alternatively be performed by a plurality of network switch devices 100 that are stacked together. Similarly, in some embodiments, any of the above features that is described as being performed by the processing unit 142 may alternatively be performed by a plurality of processing units 142 at the respective network switch devices 100 that are stacked together. FIG. 5 illustrates an example of a stacked configuration in which multiple network switch devices 100*a*-100*b* are stacked together. Network switch device 100*a* is communicatively coupled to a network monitoring instrument 170*a*, and nodes 160*a*, 160*b*. Network switch device 100*b* is communicatively coupled to a network monitoring instrument 170*b*, and node 160*c*. Network switch device 100*c* is communicatively coupled to network monitoring instruments 170*c*, 170*d*, and node 160*d*. In some embodiments, the stacked network switch devices 100 may be considered to be a network switch appliance itself.

Figure 6:
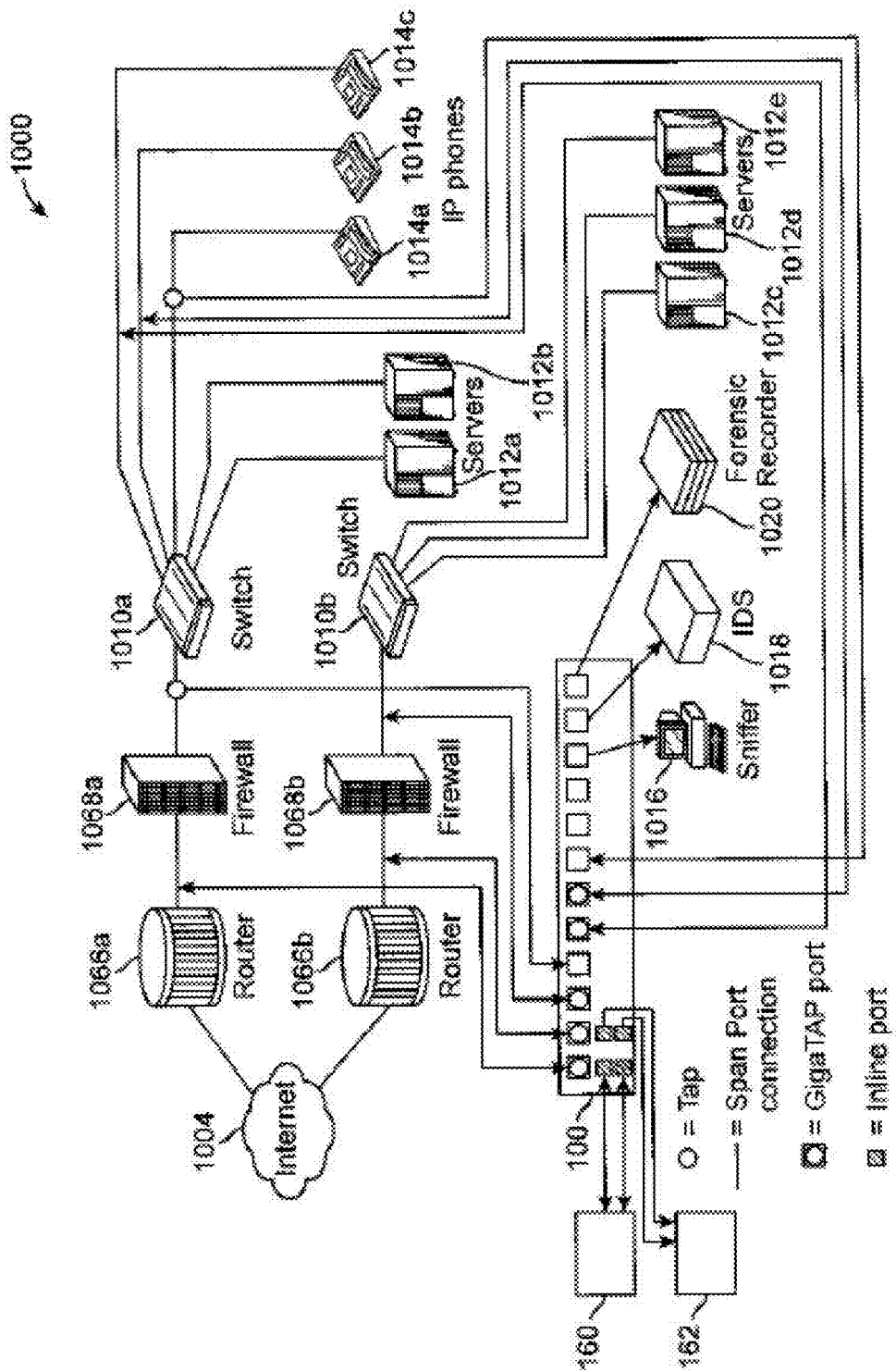
FIG. 6 illustrates a deployment of a network switch appliance in accordance with some embodiments.

FIG. 6 shows the deployment of the network switch device 100 in a network environment 1000 in accordance with some embodiments. The Internet 1004 is coupled via routers 1006*a*-*b* and firewalls 1068*a*-*b* to two switches 1010*a* and 1010*b*. Switch 1010*a* is coupled to servers 1012*a*-*b* and IP phones 1014*a*-*c*. Switch 1010*b* is coupled to servers 1012*c*-*e*. A sniffer 1016, an IDS 1018 and a forensic recorder 1020 (collectively, "non-pass through instruments") are coupled to the device 100. As illustrated in FIG. 6, there is a reduction on the number of non-pass through instruments in this deployment as compared to a conventional configuration (in which there may be one or more non-pass through instruments between router 1066*a* and firewall 1068*a*, one or more non-pass through instruments between firewall 1068*a* and switch 1010*a*, one or more non-pass through instruments between router 1066*b* and firewall 1068*b*, and firewall 1068*b* and switch 1010*b*) because the same non-pass through instruments can now access information anywhere in the network environment 1000 through the device 100. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014*a*-*c* can be easily configured to be sent to an IDS 1018. It is also possible that traffic inside a particular IP phone 1014*a*-*c* connection can be sent to a sniffer 1016, and Intrusion Detection System 1018 and a forensic recorder 1020 simultaneously via the one-to-many function.

In some embodiments, when using the device 100, one or more non-pass through instruments (such as IDS, sniffer, forensic recorder, etc.) may be connected to instrument port(s), and one or more pass through instruments 140a, 140b (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the device 100, the device 100 can compare whether the IDS or the IPS sees more threats, and/or can have a redundant protection such that if the IPS misses any threat, the IDS may pick it up.

Computer System Architecture

Figure 7:
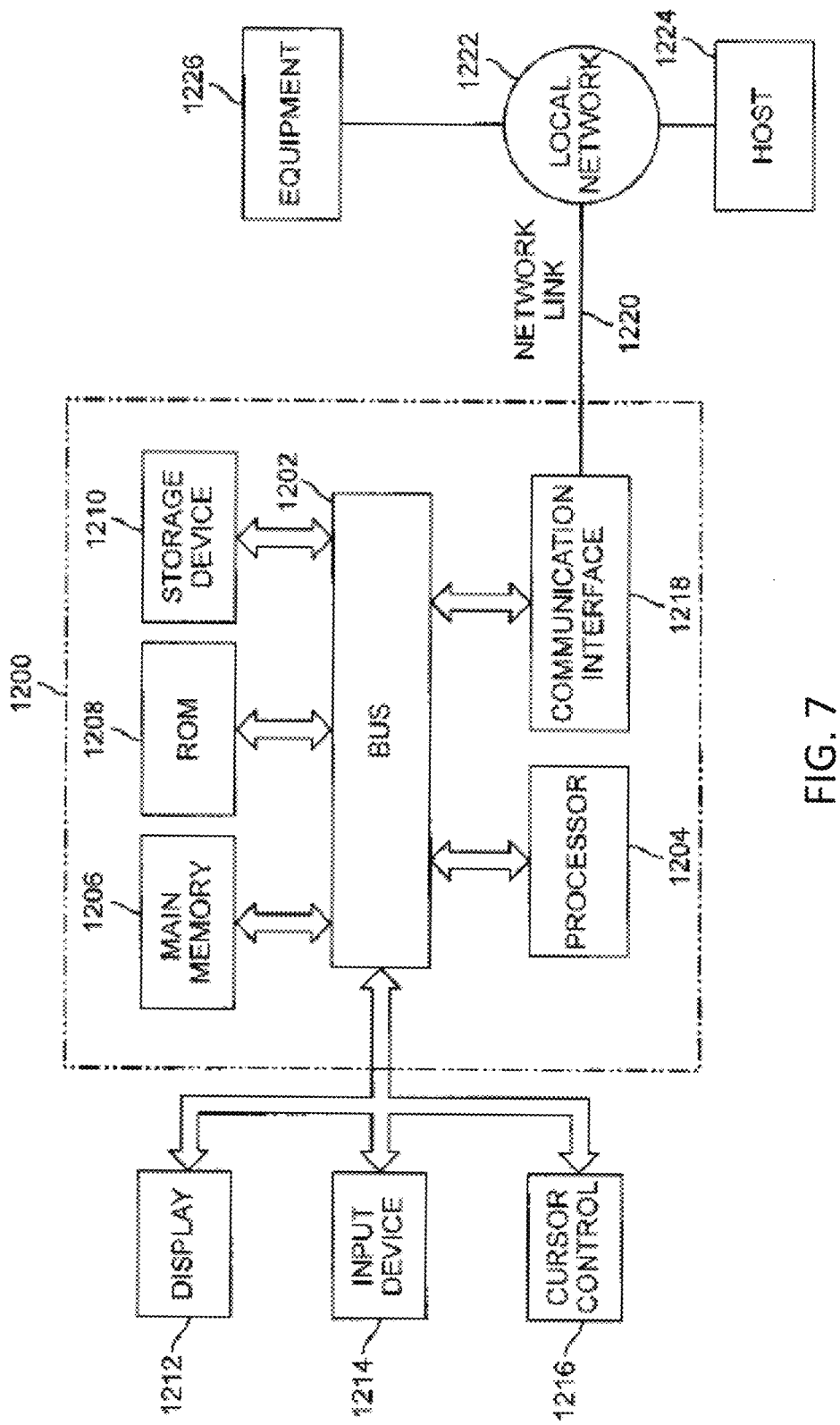
FIG. 7 illustrates an example of a computer system with which embodiments described herein may be implemented.

FIG. 7 is a block diagram that illustrates an embodiment of a computer system 1200 upon which embodiments described herein may be implemented. For example, in some embodiments, the computer system 1200 may be used to implement one or more functions of the processing unit 142, or one or more functions of the switch 140 described herein. Computer system 1200 includes a bus 1202 or other communication mechanism for communicating information, and a processor 1204 coupled with the bus 1202 for processing information. The processor 1204 may be used to perform various functions described herein. For example, in some embodiments, the processor 1204 may receive input from a user for configuring a network component (e.g., the component 380).

The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network(s), the network link 1220, and the communication interface 1218.

It should be noted that when a "packet" is described in this application, it should be understood that it may refer to the original packet that is transmitted from a node, or a copy of it.

It should be noted that the terms "first", "second", etc., are used to refer to different things, and do not necessarily refer to the order of things.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A method comprising:
    receiving a plurality of packets at a network port of a network switch appliance, the network switch appliance including an instrument port for communication with a network monitoring instrument;
    identifying packets, of the received plurality of packets, as belonging to a particular network flow that is to be monitored, wherein said identifying includes
        identifying, in the network switch appliance, control plane packets as belonging to the particular network flow, based on a user-associated attribute contained in the control plane packets, the control plane packets conforming to a control plane protocol, and
        identifying, in the network switch appliance, data plane packets as belonging to the particular network flow, by correlating the identified control plane packets with corresponding data plane packets of the received plurality of packets, the data plane packets conforming to a data plane protocol and not to the control plane protocol; and
    passing to the instrument port the packets identified as belonging to the particular network flow, including the identified control plane packets and the identified data plane packets, for delivery to the network monitoring instrument.

2. The method of claim 1, wherein the data plane packets do not contain any user-associated attribute.

3. The method of claim 1, further comprising:
    identifying the network flow based on a hash value computed using one or more packet attributes.

4. The method of claim 1, further comprising:
    identifying the network flow based on a first flow selection criterion for a data path and a second flow selection criterion for a control path.

5. The method of claim 1, further comprising receiving additional packets of the network flow, and passing all of the additional packets to the instrument port in response to determining that the additional packets belong to the network flow.

6. The method of claim 1, wherein identifying packets that belong to a particular network flow that is to be monitored is based on a 5-tuple.

7. The method of claim 1, wherein identifying packets that belong to a particular network flow that is to be monitored is based on one or more of a station address, a VLAN ID, and a MPLS tunnel ID.

8. The method of claim 1, wherein identifying packets that belong to a particular network flow that is to be monitored is based on a MPLS label stack comprising one or more MPLS label identifiers.

9. The method of claim 1, wherein identifying packets that belong to a particular network flow that is to be monitored is based on a calling number, a called number, a call identifier, or an information associated with the control protocol.

10. The method of claim 1, wherein identifying packets that belong to a particular network flow that is to be monitored is based on one or more information in a GTP control protocol, a SIP control protocol, a H323 control protocol, or a Megaco protocol.

11. The method of claim 10, wherein identifying packets that belong to a particular network flow that is to be monitored is based on one or more of IMSI, MSISDN, IMEI, and APN information.

12. The method of claim 1, wherein identifying packets that belong to a particular network flow that is to be monitored is based on a first flow selection criterion for a data path and a second flow selection criterion for a control path.

13. The method of claim 1, wherein the identified packets are passed to the instrument port in an out-of-band configuration.

14. An apparatus comprising:
    a network port to receive a plurality of packets;
    an instrument port through which to communicate with a network monitoring instrument; and
    a processing unit communicatively coupled with the network port and the instrument port, and configured to
        identify packets, of the received plurality of packets, as belonging to a particular network flow that is to be monitored, by
            identifying control plane packets as belonging to the particular network flow, based on a user-associated attribute contained in the control plane packets, the control plane packets conforming to a control plane protocol, and
            identifying data plane packets as belonging to the particular network flow, by correlating the identified control plane packets with corresponding data plane packets of the received plurality of packets, the data plane packets conforming to a data plane protocol and not to the control plane protocol; and
        pass to the instrument port the packets identified as belonging to the particular network flow, including the identified control plane packets and the identified data plane packets, for delivery to the network monitoring instrument.

15. The apparatus of claim 14, wherein the data plane packets do not contain any user-associated attribute.

16. The apparatus of claim 14, further comprising:
identifying the network flow based on a hash value computed using one or more packet attributes.

17. The apparatus of claim 14, further comprising:
identifying the network flow based on a first flow selection criterion for a data path and a second flow selection criterion for a control path.

18. The apparatus of claim 14, further comprising receiving additional packets of the network flow, and passing all of the additional packets to the instrument port in response to determining that the additional packets belong to the network flow.

19. The apparatus of claim 14, wherein identifying packets that belong to a particular network flow that is to be monitored is based on a 5-tuple.

20. The apparatus of claim 14, wherein identifying packets that belong to a particular network flow that is to be monitored is based on one or more of a station address, a VLAN ID, and a MPLS tunnel ID.

21. The apparatus of claim 14, wherein identifying packets that belong to a particular network flow that is to be monitored is based on a MPLS label stack comprising one or more MPLS label identifiers.

22. The apparatus of claim 14, wherein identifying packets that belong to a particular network flow that is to be monitored is based on a calling number, a called number, a call identifier, or an information associated with the control protocol.

23. The apparatus of claim 14, wherein identifying packets that belong to a particular network flow that is to be monitored is based on one or more information in a GTP control protocol, a SIP control protocol, a H323 control protocol, or a Megaco protocol.

24. The apparatus of claim 14, wherein identifying packets that belong to a particular network flow that is to be monitored is based on one or more of IMSI, MSISDN, IMEI, and APN information.

25. The apparatus of claim 14, wherein identifying packets that belong to a particular network flow that is to be monitored is based on a first flow selection criterion for a data path and a second flow selection criterion for a control path.

26. The apparatus of claim 14, wherein the identified packets are passed to the instrument port in an out-of-band configuration.

27. A non-transitory storage medium storing instructions, execution of which by at least one processor in a network appliance causes the network appliance to execute a method comprising:
identifying packets, of a plurality of packets received at a network port of the network appliance, as belonging to a particular network flow that is to be monitored, wherein said identifying includes
identifying, in the network appliance, control plane packets as belonging to the particular network flow, based on a user-associated attribute contained in the control plane packets, the control plane packets conforming to a control plane protocol, and
identifying, in the network appliance, data plane packets as belonging to the particular network flow, by correlating the identified control plane packets with corresponding data plane packets of the received plurality of packets, the data plane packets conforming to a data plane protocol and not to the control plane protocol; and
passing, to an instrument port of the network appliance, the packets identified as belonging to the particular network flow, including the identified control plane packets and the identified data plane packets, for delivery to a network monitoring instrument.

28. The non-transitory storage medium of claim 27, wherein the data plane packets do not contain any user-associated attribute.

29. The non-transitory storage medium of claim 27, further comprising:
identifying the network flow based on a hash value computed using one or more packet attributes.

30. The non-transitory storage medium of claim 27, further comprising:
identifying the network flow based on a first flow selection criterion for a data path and a second flow selection criterion for a control path.

31. The non-transitory storage medium of claim 27, further comprising receiving additional packets of the network flow, and passing all of the additional packets to the instrument port in response to determining that the additional packets belong to the network flow.

32. The non-transitory storage medium of claim 27, wherein identifying packets that belong to a particular network flow that is to be monitored is based on a 5-tuple.

33. The non-transitory storage medium of claim 27, wherein identifying packets that belong to a particular network flow that is to be monitored is based on one or more of a station address, a VLAN ID, and a MPLS tunnel ID.

34. The non-transitory storage medium of claim 27, wherein identifying packets that belong to a particular network flow that is to be monitored is based on a MPLS label stack comprising one or more MPLS label identifiers.

35. The non-transitory storage medium of claim 27, wherein identifying packets that belong to a particular network flow that is to be monitored is based on a calling number, a called number, a call identifier, or an information associated with the control protocol.

36. The non-transitory storage medium of claim 27, wherein identifying packets that belong to a particular network flow that is to be monitored is based on one or more information in a GTP control protocol, a SIP control protocol, a H323 control protocol, or a Megaco protocol.

37. The non-transitory storage medium of claim 27, wherein identifying packets that belong to a particular network flow that is to be monitored is based on one or more of IMSI, MSISDN, IMEI, and APN information.

38. The non-transitory storage medium of claim 27, wherein identifying packets that belong to a particular network flow that is to be monitored is based on a first flow selection criterion for a data path and a second flow selection criterion for a control path.

39. The non-transitory storage medium of claim 27, wherein the identified packets are passed to the instrument port in an out-of-band configuration.

* * * * *